(12) United States Patent
Najari et al.

(10) Patent No.: US 8,406,500 B2
(45) Date of Patent: Mar. 26, 2013

(54) SIMULTANEOUSLY SCANNING MULTIPLE CHECKS

(75) Inventors: Amir Najari, Toronto (CA); Kenneth Fang, Arcadia, CA (US); William Gugg, Schomberg (CA); Thomas Kettell, Eden Prairie, MN (US)

(73) Assignee: Seiko Epson Corporation, Tokyo (JP)

( * ) Notice: Subject to any disclaimer, the term of this patent is extended or adjusted under 35 U.S.C. 154(b) by 690 days.

(21) Appl. No.: 12/690,314

(22) Filed: Jan. 20, 2010

(65) Prior Publication Data
US 2010/0226559 A1 Sep. 9, 2010

Related U.S. Application Data

(60) Provisional application No. 61/157,082, filed on Mar. 3, 2009.

(51) Int. Cl.
*G06K 9/00* (2006.01)
(52) U.S. Cl. .......................................... 382/137; 382/181
(58) Field of Classification Search ........................ None
See application file for complete search history.

(56) References Cited

U.S. PATENT DOCUMENTS

| | | | |
|---|---|---|---|
| 3,033,449 A * | 5/1962 | Quinn et al. | 235/439 |
| 3,576,972 A | 5/1971 | Wood et al. | |
| 3,800,124 A | 3/1974 | Walsh | |
| 4,153,931 A * | 5/1979 | Green et al. | 705/28 |
| 4,790,475 A * | 12/1988 | Griffin | 229/69 |
| 4,822,017 A | 4/1989 | Griesmyer | |
| 4,966,477 A * | 10/1990 | Vitale | 400/522 |
| 5,740,271 A * | 4/1998 | Kunkler et al. | 382/137 |
| 5,790,697 A * | 8/1998 | Munro et al. | 382/135 |
| 5,905,810 A * | 5/1999 | Jones et al. | 382/135 |
| 6,014,454 A * | 1/2000 | Kunkler | 382/137 |
| 6,282,826 B1 * | 9/2001 | Richards | 40/654.01 |
| 6,373,590 B1 | 4/2002 | Ancin et al. | |
| 6,647,136 B2 * | 11/2003 | Jones et al. | 382/137 |
| 6,672,452 B1 * | 1/2004 | Alves et al. | 206/232 |
| 6,913,188 B2 * | 7/2005 | Wong et al. | 229/67.1 |
| 7,028,008 B2 | 4/2006 | Powar | |
| 7,197,644 B2 | 3/2007 | Brewington | |
| 7,225,975 B1 | 6/2007 | Cantley et al. | |
| 7,896,232 B1 * | 3/2011 | Prasad et al. | 235/379 |
| 8,235,284 B1 * | 8/2012 | Prasad et al. | 235/379 |
| 2006/0102704 A1 | 5/2006 | Reynders et al. | |

(Continued)

OTHER PUBLICATIONS

Panini Launches New Small Business RDC Check Scanner, San Diego (Business Wire), Feb. 23, 2009, (pp. 1-4).
Scanning Your Money to the Bank, Saul Hansell, Feb. 7, 2008, (pp. 2-16).
Home Banking in the 21st Century: Remote Capture Has Gone Retail, Dan M. Fishier, May 2008, (pp. 1-4).

*Primary Examiner* — Manav Seth

(57) ABSTRACT

Simultaneous scanning of multiple checks. In one example embodiment, a method for simultaneous scanning of multiple checks with a flatbed scanner includes several acts. First, a front side of a transparent sleeve is scanned on a flatbed scanner in order to create a first image. The sleeve has multiple pockets with a check positioned in each pocket. The sleeve further has multiple alignment markings on the front side and on a back side of the sleeve. Next, the back side of the sleeve is scanned on the flatbed scanner in order to create a second image. Then, it is determined from the respective positions of the alignment markings on the first image and on the second image that the sleeve was rotated between scans. Finally, one of the first and second images is automatically rotated to match the other image in order to align each front/back check image pair.

18 Claims, 6 Drawing Sheets

U.S. PATENT DOCUMENTS

| | | |
|---|---|---|
| 2007/0078906 A1 | 4/2007 | Brosseau et al. |
| 2007/0098244 A1* | 5/2007 | Franklin et al. ............... 382/139 |
| 2007/0127087 A1 | 6/2007 | Nabemoto et al. |
| 2007/0156438 A1 | 7/2007 | Popadic et al. |
| 2008/0068674 A1 | 3/2008 | McIntyre |
| 2008/0126245 A1 | 5/2008 | Rosenberg |
| 2008/0247629 A1 | 10/2008 | Gilder et al. |
| 2008/0301441 A1 | 12/2008 | Calman et al. |

* cited by examiner

SIMULTANEOUSLY SCANNING MULTIPLE CHECKS

CROSS-REFERENCE TO A RELATED APPLICATION

This application claims the benefit of U.S. Provisional Patent Application Ser. No. 61/157,082 filed on Mar. 3, 2009, which is incorporated herein by reference in its entirety.

THE FIELD OF THE INVENTION

Embodiments of the present invention relate to check scanning and processing. More specifically, example embodiments of the present invention relate to the simultaneous scanning of multiple checks with an imaging device such as a flatbed scanner and automatically processing the scanned check images.

BACKGROUND

Paper checks can be used to pay bills and purchase goods and services. When a business receives a check from a customer, the business needs to present the check to a bank in order to cash the check or deposit the check into a business account. Since the implementation of the Check Clearing for the 21st Century Act in 2004, it is now possible to send the image of a check to the bank instead of sending the actual paper check to the bank. As technology advances, banks and other financial institutions are increasingly providing online facilities that allow end users to deposit checks online based on rules that govern check image exchange.

Most current solutions for producing an image of a check require the end user to utilize special purpose check scanners. These check scanners are typically purchased, leased, or rented from banks or other financial institutions. These special purpose check scanners scan the checks and also perform character recognition on the bank number and the account number printed in a Magnetic Ink Character Recognition (MICR)-type font on the bottom of the scanned checks. These scanners are costly and cannot be used for general purpose scanning of other types of documents.

SUMMARY

In general, example embodiments relate to simultaneous scanning of multiple checks with a conventional flatbed scanner and automatically processing the scanned check images. This simultaneous scanning of multiple checks is accomplished using a transparent sleeve having multiple pockets that each holds a single paper check. The example embodiments disclosed herein can decrease the required number of scan operations to two regardless of the number of pockets in the transparent sleeve. For example, where a sleeve includes three pockets, the required number of scan operations is only two. This compares favorably to the six required scan operations required to scan the front and back of each of the three checks individually. The example embodiments disclosed herein also enable automatic correction of scanned check images where a sleeve is inadvertently rotated by a user between front and back scan operations. The techniques disclosed can be carried out via a conventional flatbed scanner (or similar imaging device) and don't require special purpose check scanners. As flatbed scanners are generally less expensive than special purpose check scanners, the example embodiments disclosed herein enable less costly electronic processing of paper checks.

In a first example embodiment, a method for simultaneous scanning of multiple checks with a flatbed scanner includes several acts. First, a front side of a transparent sleeve is scanned on a flatbed scanner in order to create a first image of first sides of multiple checks. The sleeve has multiple pockets with one of the checks positioned in each pocket. The sleeve further has multiple alignment markings on the front side and on a back side of the sleeve. Next, the back side of the sleeve is scanned on the flatbed scanner in order to create a second image of second sides of the multiple checks. Then, it is determined from the respective positions of the alignment markings on the first image and on the second image that the sleeve was rotated between scans. Finally, one of the first and second images is automatically rotated to match the other image in order to align each front/back check image pair.

In a second example embodiment, one or more computer-readable media have computer-readable instructions thereon which, when executed by a processor, implement the method for simultaneous scanning of multiple checks with a flatbed scanner discussed above in connection with the first example embodiment.

In a third example embodiment, a sleeve is configured to facilitate the simultaneous scanning of multiple checks with a flatbed scanner. The sleeve includes a transparent front sheet, a transparent back sheet attached to the front sheet, and a plurality of pockets formed between the front sheet and the back sheet, and multiple alignment markings visible on the front sheet and the back sheet. Each pocket is sized and configured to receive a paper check.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which.

DETAILED DESCRIPTION OF SOME EXAMPLE EMBODIMENTS

Figure 1:
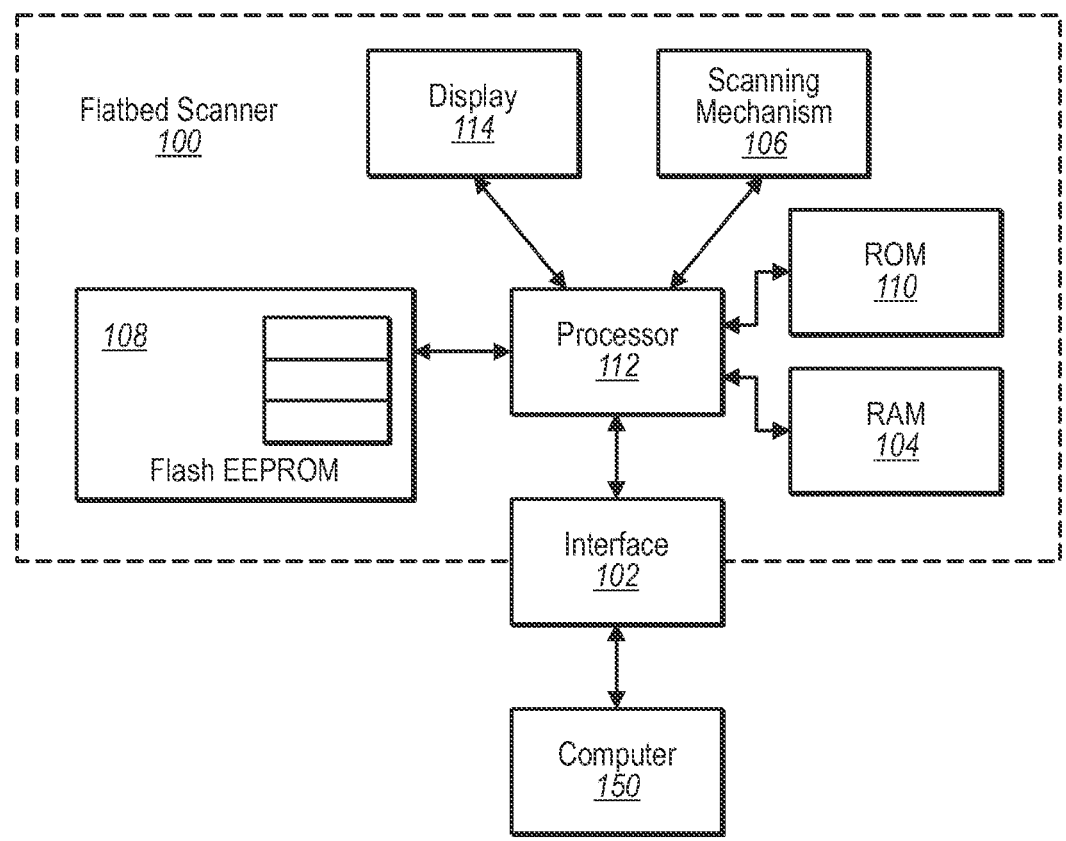
FIG. 1 is a schematic representation of an example scanner.

In the following detailed description of the embodiments, reference is made to the accompanying drawings that show, by way of illustration, specific embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to simultaneous scanning of multiple checks with a flatbed scanner and automatically processing the scanned check images. This simultaneous scanning of multiple checks is accomplished using a transparent sleeve having multiple pockets that each holds a single paper check. The example embodiments disclosed herein can decrease the required number of scan operations to two regardless of the number of pockets in the transparent sleeve. For example, where a sleeve includes three pockets, the required number of scan operations is only two. This compares favorably to the six required scan operations required to scan the front and back of each of the three checks individually. The example embodiments disclosed herein also enable automatic correction of scanned check images where a sleeve is inadvertently rotated by a user between front and back scan operations. As flatbed scanners are generally less expensive than special purpose check scanners, the example embodiments disclosed herein enable less costly electronic processing of paper checks. As used herein, the term "check" includes all financial instruments with a bank number and an account number printed in a MICR-type font, such as E-13B and CMC-7, along the bottom edge of the document, such as personal or business checking account checks and deposit slips.

I. Example Environment

The example methods and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing apparatuses such as digital cameras (an example of which includes, but is not limited to, the Epson R-D1 digital camera manufactured by Seiko Epson Corporation headquartered in Owa, Suwa, Nagano, Japan), digital document cameras (an example of which includes, but is not limited to, the Epson DC-10s document camera manufactured by Seiko Epson Corporation) digital camcorders, projectors, printers (examples of which include, but are not limited to, the Epson Artisan® 50 Ink Jet Printer, Epson WorkForce 30 and 40 Ink Jet Printers, the Epson Stylus C88+, Photo 8280, Photo 1400, Photo R1900, and Photo R2880 Ink Jet Printers, and Epson B-300 and B-500DN Color Business Ink Jet Printers, all manufactured by Seiko Epson Corporation), scanners (examples of which include, but are not limited to, the Epson Perfection© V30, V200, V300, V500, V700, 4490, V750-M Pro, and 4490, the Epson Expression© 10000XL, and the Epson GT-580, GT-1500, GT-2500, GT-15000, GT-20000, and GT-30000, all manufactured by Seiko Epson Corporation), copiers, portable photo viewers (examples of which include, but are not limited to, the Epson P-3000, P-5000, P-6000, and P-7000 portable photo viewers manufactured by Seiko Epson Corporation), or portable movie players, or some combination thereof, such as printer/scanner/copier combinations or "All-in-Ones" (examples of which include, but are not limited to, the Epson Stylus Photo RX580, RX595, or RX680, the Epson Stylus CX4400, CX7400, CX8400, or CX9400Fax, the Epson AcuLaser® CX11NF, and the Epson Artisan® 500, 600, 700, and 800, all manufactured by Seiko Epson Corporation) or a digital camera/camcorder combinations.

An image processing apparatus may include the capability to simultaneously scan multiple checks with a flatbed scanner and automatically process the scanned check images, for example, to prepare the scanned check images for electronic deposit into an account at a financial institution. For example, a flatbed scanner that has this check scanning and image processing capability may include one or more computer-readable media that implement the example methods disclosed herein, or a computer connected to the flatbed scanner may include one or more computer-readable media that implement the example methods disclosed herein.

While any imaging apparatus could be used, for purposes of illustration an example embodiment will be described in connection with an example flatbed scanner, a schematic representation of which is denoted at 100 in FIG. 1. Example embodiments of the flatbed scanner 100 include, but are not limited to, the scanner models or printer/scanner/copier "All-in-One" models disclosed herein.

The example flatbed scanner 100 exchanges data with a host computer 150 by way of an intervening interface 102. Application programs and a scanner driver may also be stored for access on the host computer 150 or on the flatbed scanner 100. When a scan command is received from the application program, for example, the scanner driver controls conversion of the command data to a format suitable for the flatbed scanner 100 and sends the converted command data to the flatbed scanner 100. The driver also receives and interprets various signals and data from the flatbed scanner 100, and provides necessary information to the user by way of the host computer 150.

When data is sent by the host computer 150, the interface 102 receives the data and stores it in a receive buffer forming part of a RAM 104. The RAM 104 can be divided into a number of sections, through addressing for example, and allocated as different buffers, such as a receive buffer or a send buffer. For example, scan commands can be sent to the flatbed scanner 100 from the host computer 150. Scanned images can then be obtained by the flatbed scanner 100 using a scanning mechanism 106. For example, a user can place the example transparent sleeve 200, as disclosed in FIG. 2A, on the scanning mechanism 106 of the flatbed scanner 100, and then send a document scan command through the host computer 150 or through the flatbed scanner 100, thereby causing the scanning mechanism 106 to create a first scanned image of the transparent sleeve 200. The user can then flip the transparent sleeve 200 over, as disclosed in FIG. 2B, and place the transparent sleeve 200 once again on the scanning mechanism 106 to create a second scanned image of the transparent sleeve 200 that corresponds to the first scanned document image. The first and second images can then be processed in order to electronically transmit each front/back check image pair to a financial institution. Scanned images can be also obtained by the flatbed scanner 100 from the flash EEPROM 108 or the ROM 110. For example, a portable flash EEPROM card can be inserted into the flatbed scanner 100. The scanned document images can then be stored in the receive buffer or the send buffer of the RAM 104.

A processor 112 uses computer-executable instructions stored on the ROM 110 or on the flash EEPROM 108, for example, to perform a certain function or group of functions, such as the example methods for simultaneous scanning of multiple checks disclosed herein. The processor 112 can implement the methodological acts of the example methods for simultaneous scanning of multiple checks disclosed herein to automatically scan and then process multiple check images. The check images can then be sent to a display 114 for a preview display thereon or to the host computer 150 for transmission to a financial institution over a network such as the Internet, for example. The processor 112 is in electronic communication with the display 114, which can be any type of an electronic display including, but not limited to a visual display such as a liquid crystal display (LCD).

II. Example Transparent Sleeve

Figure 2A:
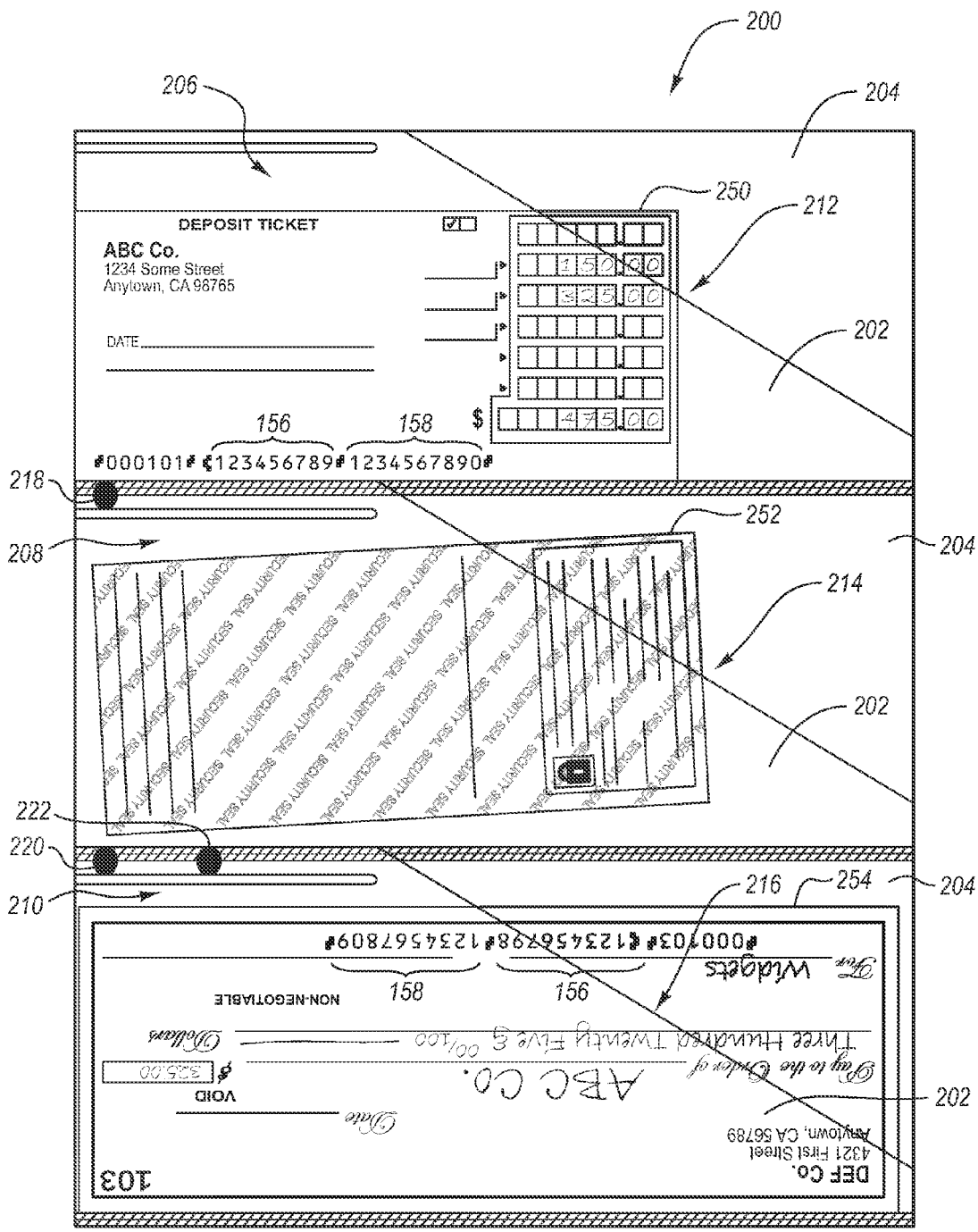
FIG. 2A is a front upright scan of an example transparent sleeve holding three paper checks.
Figure 2B:
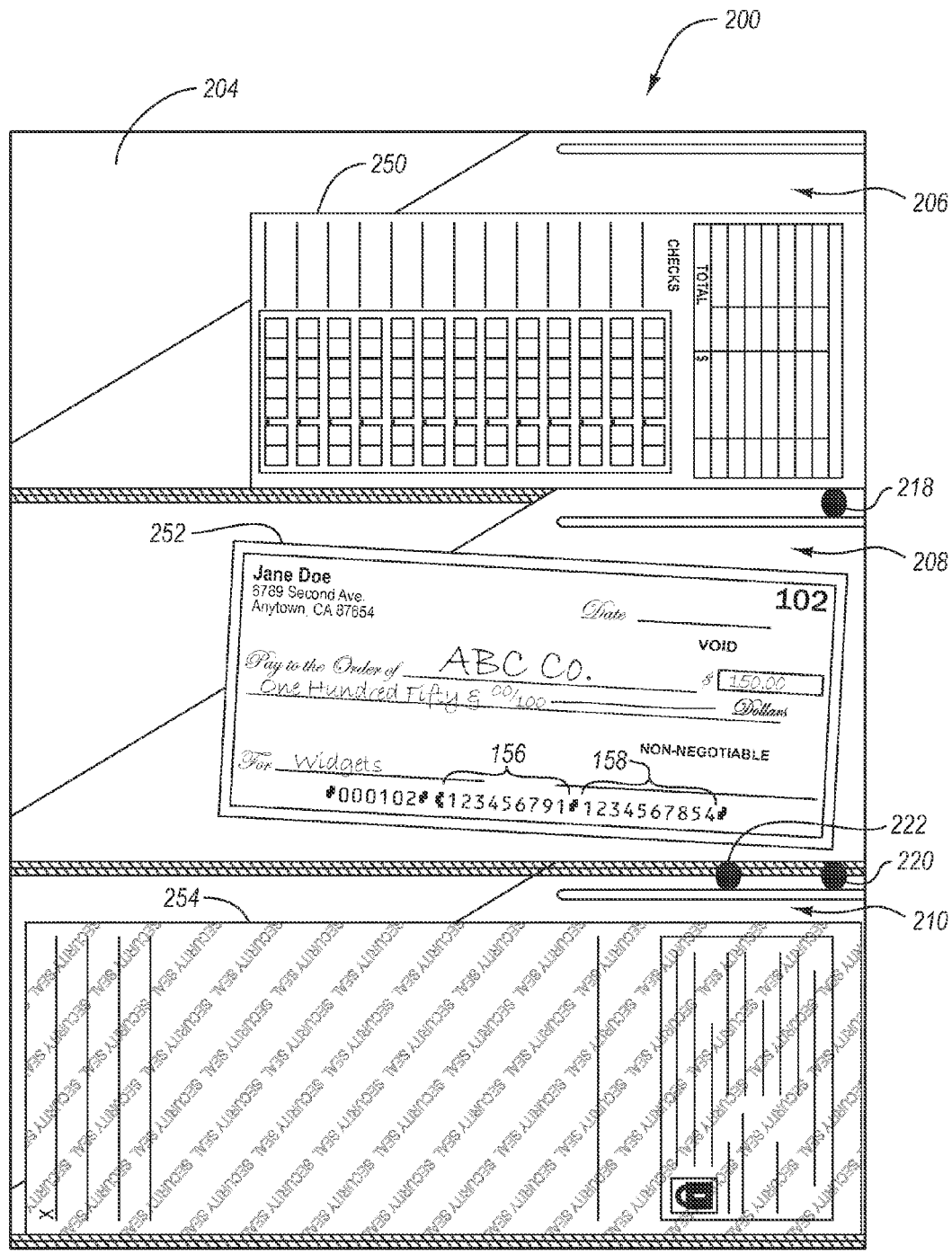
FIG. 2B is a back upright scan of the example transparent sleeve and paper checks of FIG. 2A.
Figure 2C:
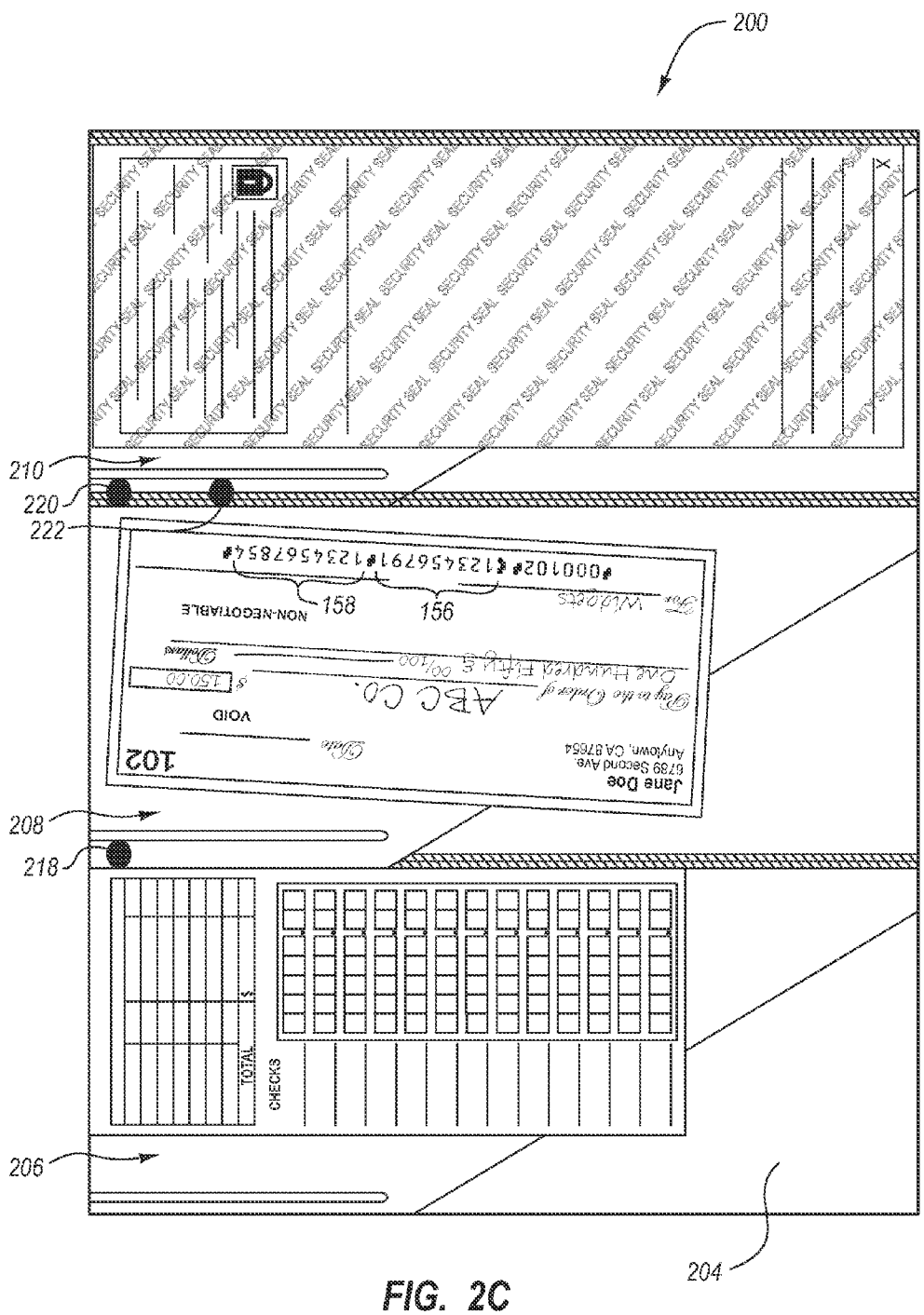
FIG. 2C is a back upside-down scan of the example transparent sleeve and paper checks of FIG. 2A.
Figure 3A:
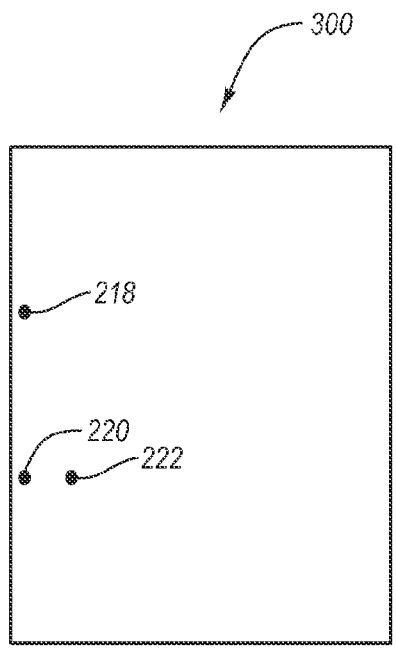
FIG. 3A is a template for the positions of example alignment markings on the front of the example transparent sleeve of FIG. 2A when the sleeve is oriented upright.
Figure 3B:
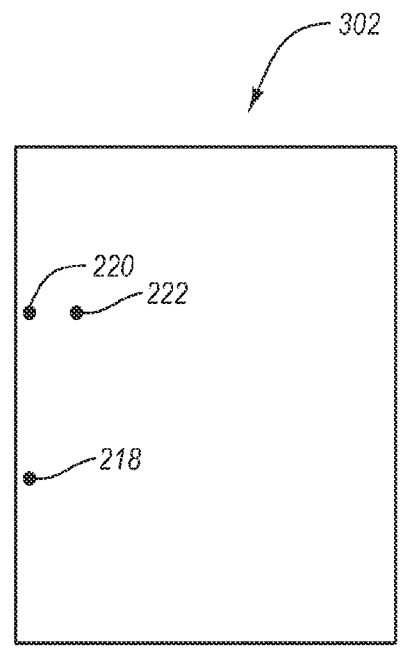
FIG. 3B is a template for the positions of example alignment markings on the front of the example transparent sleeve of FIG. 2A when the sleeve is oriented upside down.
Figure 3C:
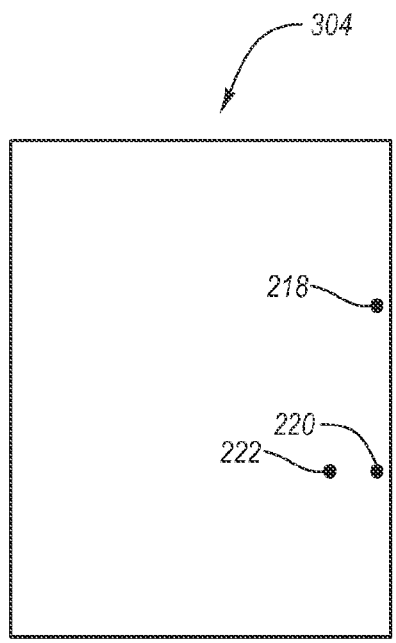
FIG. 3C is a template for the positions of example alignment markings on the back of the example transparent sleeve of FIG. 2A when the sleeve is oriented upright.
Figure 3D:
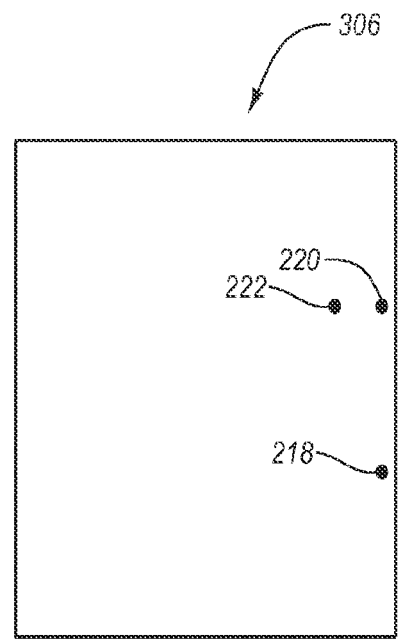
FIG. 3D is a template for the positions of example alignment markings on the back of the example transparent sleeve of FIG. 2A when the sleeve is oriented upside down.

FIGS. 2A-2C are various scans of an example transparent sleeve 200 holding paper checks 250-254. Each check 250-254 includes a bank number 156 and an account number 158 printed in a MICR-type font along a bottom edge of the check. As disclosed in FIGS. 2A-2C, the example transparent sleeve is configured to facilitate the simultaneous scanning of multiple checks with a flatbed scanner. The sleeve 200 includes a transparent front sheet 202, a transparent back sheet 204 attached to the front sheet, and first, second, and third pockets 206, 208, and 210 formed between the front sheet 202 and the back sheet 204.

Each of the pockets 206, 208, and 210 is sized and configured to receive a paper check. As disclosed in FIG. 2A, each of the pockets 206, 208, and 210 can accommodate either a standard-sized paper check (such as the standard-sized checks 250 and 252) or a business-sized paper check (such as the business-sized check 254). It is understood that in other example embodiments, the pockets of the sleeve 200 need not have the same sizes. For example, some of the pockets of the sleeve 200 can be standard-sized and some of the pockets can be business-sized. Further, all of the pockets of the sleeve 200 can instead be standard-sized in order to accommodate a greater number of pockets on the sleeve 200. For example, instead of just the three pockets 206-210, the sleeve 200 may include four or more pockets.

Each of the pockets 206, 208, and 210 also includes a slanted opening 212, 214, and 216, respectively. The slanted openings 212, 214, and 216 enable a user to slide a check along the surface of the back sheet 204 and underneath the surface of the front sheet 202 while the check passes through the slanted opening, thus facilitating easy entry of the check into the pocket. Further, the slanted openings 212, 214, and 216 leave one corner of the check outside the pockets 206, 208, and 210, respectively, thus enabling the user to easily grasp the check and pull it from the pocket, or push it into the pocket, without reaching inside the pocket. The sleeve 200 also helps to hold each of the checks 250-254 in the proper position when a flatbed scanner lid is shutting. A shutting lid can tend to inadvertently rotate a single paper check more easily than it can rotate the larger sleeve 200.

The example transparent sleeve 200 further includes alignment markings 218, 220, and 222 visible on the front sheet 202 and the back sheet 204. The positions of the alignment markings 218, 220, and 222 in a scanned image can be used to determine the orientation of the sleeve 200. With reference now to FIGS. 3A-3D, various templates 300-306 for the positions of the example alignment markings 218-222 of the example transparent sleeve 200 are disclosed. For example, the positions of the example alignment markings 218-222 on the template 300 of FIG. 3A correspond to the example transparent sleeve 200 oriented in a front upright position. Similarly, the positions of the example alignment markings 218-222 on the templates 302, 304, and 306 of FIG. 3B-3D correspond to the example transparent sleeve 200 oriented in a front up-side down position, a back upright position, and a back upside down position, respectively.

The templates 300-306 can thus be used to automatically determine the orientation of the sleeve 200 in a scanned image. For example, the positions of the alignment markings 218, 220, and 222 in the scanned image of FIG. 2A match template 300, and thus the sleeve 200 in FIG. 2A can automatically be determined to be oriented in a front upright position. Similarly, the positions of the alignment markings 218, 220, and 222 in the scanned images of FIG. 2B matches template 304, and thus the sleeve 200 in FIG. 2B can be automatically determined to be oriented in a back upright position. Also, the positions of the alignment markings 218, 220, and 222 in the scanned images of FIG. 2C matches template 306, and thus the sleeve 200 in FIG. 2C can be automatically determined to be oriented in a back upside down position. A comparison of the orientations of the scans of FIGS. 2A and 2B reveals that the sleeve 200 was simply flipped over, and was not rotated, between the scans of FIGS. 2A and 2B. On the other hand, a comparison of the orientations of the scans of FIGS. 2A and 2C reveals that the sleeve 200 was not only flipped over but also rotated about 180 degrees between the scans of FIGS. 2A and 2C. This determination allows for the automatic 180 degree rotation of the scan of FIG. 2C so that the fronts of the checks 250-254 will match the backs of the checks 250-254.

As disclosed in FIGS. 2A-2C, the first alignment marking 218 is positioned between the first pocket 206 and second pocket 208. The second and third alignment markings 220 and 222 are positioned between the second pocket 208 and the third pocket 210. The first, second, and third alignment markings 218, 220, and 222 are circular markings that are visible on both the front side 202 and back side 204 of the transparent sleeve 200. It is understood that in other example embodiments, the alignment markings 218, 220, and 222 may be shapes other than circular and may be positioned in positions other than those disclosed in FIGS. 2A-2C.

III. Example Method for Simultaneous Scanning of Multiple Checks

Figure 4:
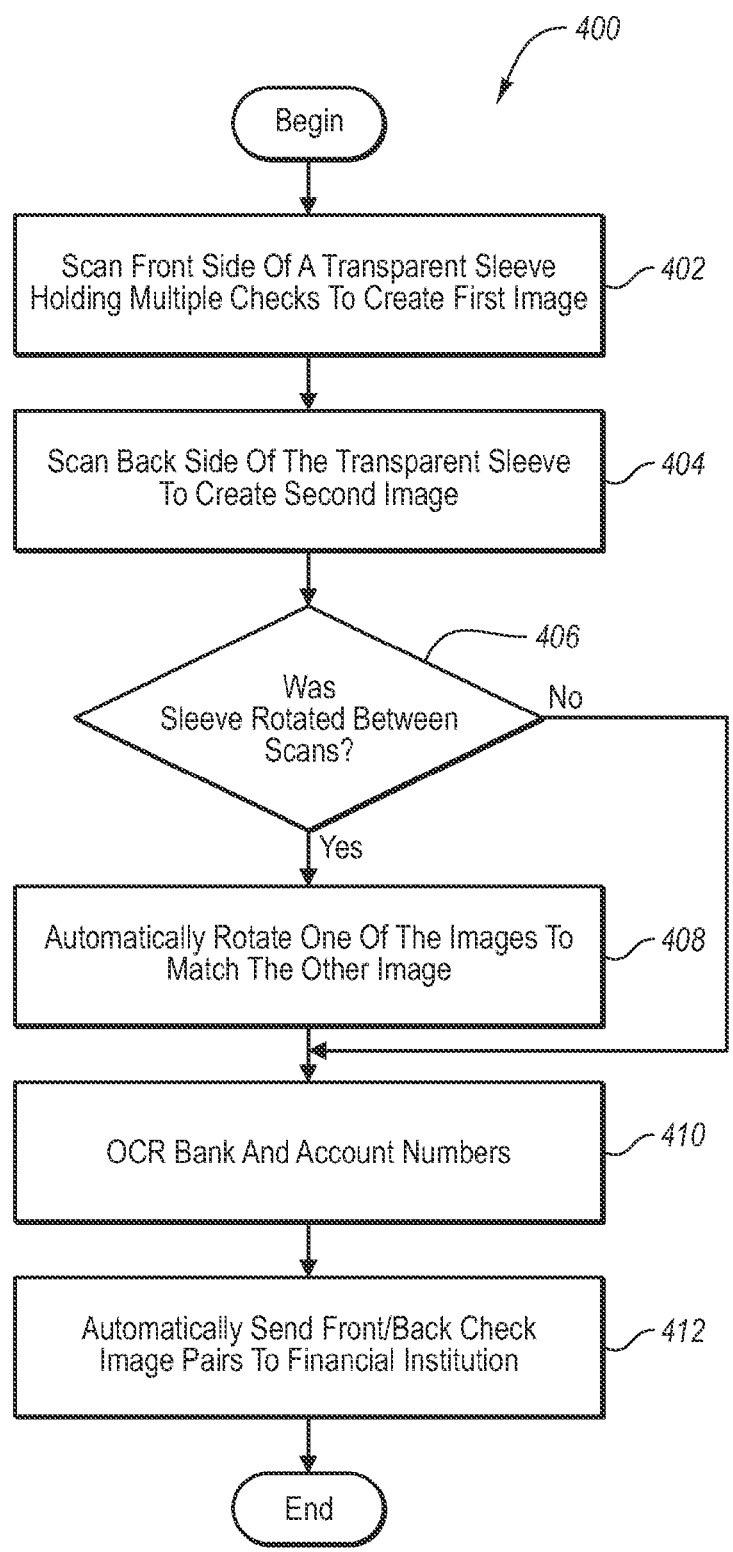
FIG. 4 is a flowchart of an example method for simultaneous scanning of multiple checks with a flatbed scanner.

With reference now to FIG. 4, an example method 400 for simultaneous scanning of multiple checks with a flatbed scanner is disclosed. The example method 400 is accomplished using a transparent sleeve having multiple pockets that each holds a paper check. Prior to the execution of the example method 400, the pockets of the transparent sleeve are filled with checks. For example, the transparent sleeve 200 disclosed in FIG. 2A can be filled with the checks 250, 252, and 254. The various acts of the method 400 will now be discussed in turn.

First, at 402, a front side of a transparent sleeve is scanned on a flatbed scanner in order to create a first image of first sides of the multiple checks. The sleeve has multiple pockets with a paper check positioned in each pocket and has front and back sides with multiple alignment markings. For example, the front side of the transparent sleeve 200 disclosed in FIG. 2A can be scanned on the flatbed scanner 100 disclosed in FIG. 1 in order to create a first image of the first sides of the checks 250, 252, and 254. In this example, it is noted that the first sides of the checks 250 and 254 are the front sides of the checks 250 and 254, while the first side of the check 252 is the back side of the check 252.

Next, at 404, the back side of the sleeve is scanned on the flatbed scanner in order to create a second image of second sides of the multiple checks. For example, the back side of the transparent sleeve 200 disclosed in FIG. 2B or FIG. 2C can be scanned on the flatbed scanner 100 disclosed in FIG. 1 in order to create a second image of the second sides of the checks 250, 252, and 254. In this example, it is noted that the second sides of the checks 250 and 254 are the back sides of the checks 250 and 254, while the second side of the check 252 is the front side of the check 252.

Then, at 406, a determination is made as to whether the respective positions of the alignment markings on the first image and on the second image indicate that the sleeve was rotated between scans.

For example, the templates 300-306 of FIGS. 3A-3D can be employed to determine the orientations of the first image of FIG. 2A and of the second image of FIG. 2B. The orientations can then be compared. This comparison would indicate that the sleeve 200 was flipped over, but not rotated, between scans. The method 400 would then proceed to the act 410.

In another example, the templates 300-306 of FIGS. 3A-3D can be employed to determine the orientations of the first image of FIG. 2A and of the second image of FIG. 2C. The orientations can then be compared. This comparison would indicate that the sleeve 200 was flipped over and also rotated between scans. The method 400 would then proceed to the act 408 where one of the first and second images is automatically rotated to match the other image in order to align each front/back check image pair. For example, the second image taken of FIG. 2C can be automatically rotated about 180 degrees in order to transform the second image into an image with the orientation disclosed in FIG. 2B, thus aligning each front/back check image pair.

It is noted that the example act 408 transforms electronic data that represents a physical and tangible object. In particular, the example act 408 transforms an electronic data representation of a transparent sleeve holding multiple paper checks. During the example act 408, the data is transformed from a first state into a second state. In the first state, the data represents the transparent sleeve with an upside-down orientation. In the second state, the data represents the transparent sleeve with an upright orientation.

Next, at 410, optical character recognition (OCR) can be automatically performed on the bank number and the account number printed at the bottom of a front side of each check in order to associate a bank number and an account number with each front/back check image pair. For example, a front/back check image pair can be automatically cropped from the first and second images for each of the checks 250-254. Automatically cropping each front/back check image pair includes automatically recognizing the boarders of each front check image and each back check image in order to automatically remove any non-check portion of each pocket. Then, OCR can be automatically performed on the bank number 156 and the account number 158 on the front image of the front/back check image pair for each of the checks 250-254 in order to associate a bank number and an account number with each front/back check image pair. Alternatively, this act can instead be performed by the financial institution to which each front/back check image pair is sent, for example.

Then, at 412, each front/back check image pair and the associated bank and account numbers can be automatically sent to a financial institution for additional processing. For example, the front/back check image pair of the checks 250-254 can be transmitted from the example flatbed scanner 100 of FIG. 1 to a computer system of a financial institution, via a network such as the Internet for example. The financial institution can then process the front/back check image pairs, such as for deposit into the checking or savings account indicated on the deposit slip 250, or another checking or savings account, for example. Alternatively, this act can be replaced with further processing and/or temporary storage of the front/back check image pairs on the flatbed scanner 100 or the computer 150 of FIG. 1 for future transmission to a financial institution.

It is understood that the first and second images may undergo further processing during the example method 400. For example, the images of one or more of the front/back check image pairs may be automatically horizontally aligned. For example, as disclosed in FIGS. 2A and 2B, the check 252 was placed in the pocket 208 with a non-horizontal alignment. Accordingly, during the method 400, the portion of the first and second images that covers the second pocket 208 may be locally rotated in order automatically horizontally align the images of the front and back of the check 252.

Further, the example method 400 may also include the acts of detecting a bank number and an account number at the top of a front side of a front/back check image pair, and automatically rotating the front/back check image pair about 180 degrees in order to place the bank number and the account number at the bottom of the front side of the front/back check image pair. For example, as disclosed in FIGS. 2A and 2B, the check 254 was placed in the pocket 210 upside down. Accordingly, during the method 400, the bank number 156 and the account number 158 may be detected at the top of the front side (disclosed in FIG. 2A) of the front/back check image pair of the check 254, and the front/back check image pair of the check 254 may be automatically rotated about 180 degrees in order to place the bank number 156 and the account number 158 at the bottom of the front side of the front/back check image pair.

The example method 400 for simultaneous scanning of multiple checks using a flatbed scanner is therefore accomplished using a transparent sleeve having multiple pockets that each holds a paper check. The example method 400 can decrease the required number of scan operations to two regardless of the number of pockets in the transparent sleeve. The example method 400 also enables automatic correction of scanned check images where a sleeve is inadvertently rotated by a user between front and back scan operations. Further, as flatbed scanners are generally less expensive than special purpose check scanners, the example embodiments disclosed herein enable less costly electronic processing of paper checks.

The example embodiments disclosed herein may be embodied in other specific forms. The example embodiments disclosed herein are to be considered in all respects only as illustrative and not restrictive.

What is claimed is:

1. A method for simultaneous scanning of multiple checks with a flatbed scanner, the method comprising the acts of:
   i) scanning a front side of a transparent sleeve on a flatbed scanner in order to create a first image of first sides of multiple checks, the sleeve having multiple pockets with one of the checks positioned in each pocket, the sleeve further having multiple alignment markings on the front side and a back side of the sleeve;
   ii) scanning the back side of the sleeve on the flatbed scanner in order to create a second image of second sides of the multiple checks;
   iii) determining from the respective positions of the alignment markings on the first image and on the second image that the sleeve was rotated between scans; and
   iv) automatically rotating one of the first and second images to match the other image in order to substantially align each front/back check image pair.

2. The method as recited in claim 1, wherein the sleeve has:
   a first alignment marking positioned between a first pocket and a second pocket; and
   second and third alignment markings positioned between the second pocket and a third pocket.

3. The method as recited in claim 2, wherein the first, second, and third alignment markings are circular markings that are visible on both the front and back sides of the sleeve.

4. The method as recited in claim 1, wherein the act iv) further comprises automatically rotating one of the first and second images about 180 degrees to match the other image in order to substantially align each front/back check image pair.

5. The method as recited in claim 1, further comprising the acts of:
   v) automatically cropping each front/back check image pair from the first image and the second image; and
   vi) automatically performing optical character recognition (OCR) on the bank number and the account number at the bottom of each front check image in order to associate bank and account numbers with each front/back check image pair.

6. The method as recited in claim 5, further comprising the act of:
   vii) automatically sending each front/back check image pair and the associated bank and account numbers to a financial institution for additional processing.

7. The method as recited in claim 1, further comprising the act of:
   v) automatically horizontally aligning the front and back check images of a front/back check image pair.

8. The method as recited in claim 1, further comprising the acts of:
   v) detecting a bank number and an account number at the top of a front check image of a front/back check image pair; and
   vi) automatically rotating the front/back check image pair about 180 degrees in order to place the bank number and the account number at the bottom of the front check image of the front/back check image pair.

9. One or more non-transitory computer-readable media having computer-readable instructions thereon which, when executed by a processor, implement a method for simultaneous scanning of multiple checks, the method comprising the acts of:
   i) scanning a front side of a transparent sleeve to create a first image of first sides of multiple checks, the sleeve having multiple pockets with one of the checks positioned in each pocket, the sleeve further having multiple alignment markings on the front side and a back side of the sleeve;
   ii) scanning the back side of the sleeve to create a second image of second sides of the multiple checks;
   iii) determining from the respective positions of the alignment markings on the first image and on the second image that the sleeve was rotated between scans; and
   iv) automatically rotating one of the first and second images to match the other image in order to substantially align each front/back check image pair.

10. The one or more non-transitory computer-readable media as recited in claim 9, wherein the act iv) further comprises automatically rotating one of the first and second images about 180 degrees to match the other image in order to align each front/back check image pair.

11. The one or more non-transitory computer-readable media as recited in claim 10, further comprising the acts of:
   v) automatically horizontally aligning the front and back check images of one of the front/back check image pairs;
   vi) automatically performing OCR on the bank number and the account number at the bottom of the front check image of the front/back check image pair in order to associate the bank number and the account number with the front/back check image pair; and
   vii) automatically sending the front/back check image pair and the associated bank and account numbers to a financial institution for additional processing.

12. The one or more non-transitory computer-readable media as recited in claim 9, further comprising the acts of:
   v) detecting a bank number and an account number at the top of the front check image of one of the front/back check image pairs; and
   vi) automatically rotating the front/back check image pair about 180 degrees in order to place the bank number and the account number at the bottom of the front check image of the front/back check image pair.

13. An image processing apparatus comprising:
   the one or more non-transitory computer-readable media as recited in claim 9; and a processor capable of executing the computer-readable instructions on the one or more computer-readable media.

14. The image processing apparatus as recited in claim 13, wherein:
the image processing apparatus comprises a flatbed scanner; and
the one or more computer-readable media comprises one or more of a RAM, a ROM, and a flash EEPROM.

15. A sleeve configured to facilitate the simultaneous scanning of multiple checks, the sleeve comprising:
a transparent front sheet;
a transparent back sheet attached to the front sheet;
a plurality of pockets formed between the front sheet and the back sheet, each pocket sized and configured to receive a paper check; and
multiple alignment markings visible on the front sheet and the back sheet;
wherein the sleeve has (i) first second, and third pockets, (ii) a first alignment marking positioned between the first pocket and the second pocket, and (iii) second and third alignment markings positioned between the second pocket and the third pocket.

16. The sleeve as recited in claim 15, wherein the first, second, and third alignment markings are circular alignment markings.

17. A sleeve configured to facilitate the simultaneous scanning of multiple checks, the sleeve comprising:
a transparent front sheet;
a transparent back sheet attached to the front sheet;
a plurality of pockets formed between the front sheet and the back sheet, each pocket sized and configured to receive a paper check; and
multiple alignment markings visible on the front sheet and the back sheet;
wherein each pocket has a slanted opening.

18. The sleeve as recited in claim 15, wherein each pocket can accommodate either a standard-sized paper check or a business-sized paper check.

* * * * *